(No Model.)

J. REES.
WHEEL.

No. 481,821. Patented Aug. 30, 1892.

Jonathan Rees.

Witnesses
L. S. Elliott.

Inventor
by 
Attorney

UNITED STATES PATENT OFFICE.

JONATHAN REES, OF PHŒNIXVILLE, PENNSYLVANIA.

WHEEL.

SPECIFICATION forming part of Letters Patent No. 481,821, dated August 30, 1892.

Application filed April 28, 1892. Serial No. 430,992. (No model.)

*To all whom it may concern:*

Be it known that I, JONATHAN REES, a citizen of the United States of America, residing at Phœnixville, in the county of Chester and State of Pennsylvania, have invented certain new and useful Improvements in Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in vehicle-wheels.

The object of the invention is to provide a wheel having spring-spokes of improved construction, so that the desired amount of resiliency can be imparted to the vehicle; and it consists in the construction of the wheel, as will be hereinafter fully set forth, and particularly pointed out in the claims.

Figure 1:
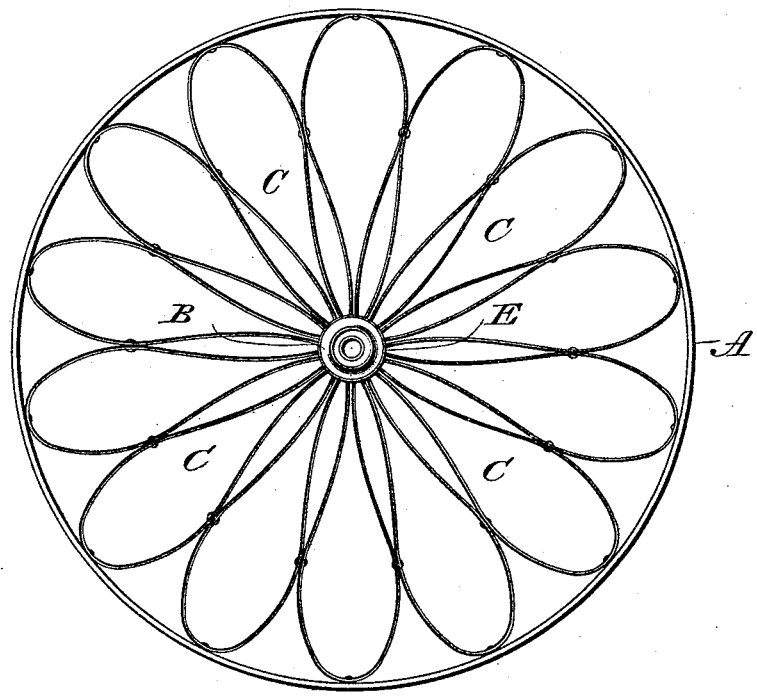
Figure 2:
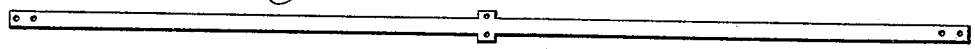
Figure 3:
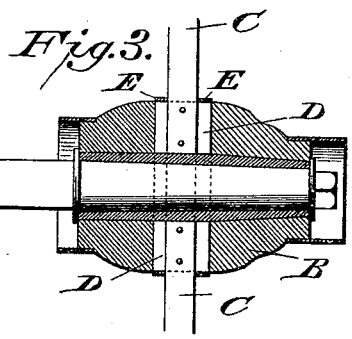
Figure 4:
Figure 4:

In the accompanying drawings, forming part of this specification, Figure 1 is a side elevation of a wheel constructed in accordance with my invention. Fig. 2 is a plan view of the spring-bar of which the spokes are formed. Fig. 3 is a sectional view of the hub of the wheel, showing the spokes applied thereto. Fig. 4 is a detail perspective view showing the connection of the ends of the spokes prior to being attached to the hub.

A designates the rim or tire of the wheel, which may be of any suitable material to form either a rigid tire or a spring metallic tire, according to the use to which the wheel is put. This tire is punctured at suitable intervals for the reception of rivets or bolts for securing the spring-spokes thereto.

B designates the hub, which is mortised at intervals to receive the ends of the spokes and plates attached thereto. The spokes C are each made up of a single piece of metal and looped to bring the ends together, as shown in Figs. 1 and 4, said ends being secured to each other and to an intermediate plate D, of the same width and depth as the mortise in the hub. The plate D is retained upon the spokes by the same rivets or securing means that retain the ends, said plate being preferably interposed between said ends. The central part of each spoke is secured to the rim or tire A by suitable connections, as a loop or rivet, the spokes having been previously looped before being placed in the hub. After the spokes have been inserted in the hub and prior to attaching them to the rim they will be of such a shape that they will occupy a space of larger diameter than the rim, and when they are compressed to lie within and are secured to the rim the side portions thereof will expand and cause the portions nearest the hub to lie in close proximity to each other. Where the looped portions of the spokes meet each other they can be riveted together or left free, as may be desired. When a spring or flexible tire is employed, it will give with the spokes, and the hub will also give proportionately, thus providing a wheel which will have a spring movement at different points. When a solid tire is used, the hub will only move within the rim.

The hub B is provided on each side of the spokes with bands E E, which are extended in the usual manner, and when placed over the plates D will retain them securely in position against withdrawal and also against lateral or sidewise movement. The spokes being flat are enabled to resist lateral strain.

I am aware that prior to my invention it has been proposed to provide a wheel with spring-spokes made up of independent pieces, which are joined at different points both to the hub and tire; also, that it is not broadly new to provide a vehicle-wheel with spring-spokes which are curved so as to be attached to the rim and to the hub at points that are not on a line with each other; but

What I claim as my invention, and desire to secure by Letters Patent, is—

1. In a vehicle-wheel, the combination of a mortised hub, spring-spokes C, having the terminal portions attached to a plate D, and bands for retaining said plates within the mortises in the hub, the loop portion of each spoke farthest from the hub being secured to the tire, substantially as shown.

2. In a vehicle-wheel, the combination of the spokes C, made up of bars of spring metal looped as shown, the terminal portions of said spokes being connected to a plate D, bands E E, adapted to encircle the hub and engage with said plates, a tire A, attached to the loop portion of the spokes, each spoke bearing against an adjacent spoke at a point between the tire and hub, and means for connecting the spokes at such points, substantially as shown, and for the purpose set forth.

3. In a vehicle-wheel, the combination of a hub having mortises to receive the ends of spring-spokes, said spokes being bent to form outer loops, which are attached to the tire at a point opposite the point where the ends are secured to the hub, and means, substantially as shown, for connecting the spokes to each other at an intermediate point between the hub and tire, for the purpose set forth.

In testimony whereof I affix my signature in presence of two witnesses.

JONATHAN REES.

Witnesses:
C. H. HOWELL,
L. A. STEIN.